(12) United States Patent
Styles et al.

(10) Patent No.: US 10,626,811 B2
(45) Date of Patent: Apr. 21, 2020

(54) EGR SYSTEM AND METHOD FOR AN OPPOSED PISTON ENGINE

(71) Applicant: Ford Global Technologies, LLC, Dearborn, MI (US)

(72) Inventors: Daniel Styles, Canton, MI (US); Eric Matthew Kurtz, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 197 days.

(21) Appl. No.: 15/861,450

(22) Filed: Jan. 3, 2018

(65) Prior Publication Data
US 2019/0203654 A1    Jul. 4, 2019

(51) Int. Cl.
| | |
|---|---|
| F02D 41/00 | (2006.01) |
| F02D 41/14 | (2006.01) |
| F01B 7/14 | (2006.01) |
| F02M 26/05 | (2016.01) |
| F02B 3/06 | (2006.01) |
| F02B 75/28 | (2006.01) |
| F02M 26/08 | (2016.01) |
| F02M 26/06 | (2016.01) |

(Continued)

(52) U.S. Cl.
CPC ............ F02D 41/0052 (2013.01); F01B 7/14 (2013.01); F02B 75/282 (2013.01); F02D 41/005 (2013.01); F02D 41/0062 (2013.01); F02D 41/0065 (2013.01); F02D 41/1459 (2013.01); F02D 41/1466 (2013.01); F02M 26/05 (2016.02); F02M 26/06 (2016.02); F02M 26/08 (2016.02); F02B 3/06 (2013.01); F02B 2075/025 (2013.01); F02D 41/0007 (2013.01); F02D 2041/0067 (2013.01); F02D 2041/0075 (2013.01); F02M 2026/001 (2016.02)

(58) Field of Classification Search
CPC ............ F02D 41/0052; F02D 41/0062; F02D 41/0007; F02D 41/0072; F02D 41/002; F02D 41/1466; F02D 41/1459; F02D 41/0065; F02D 2041/0067; F02D 2041/0075; F02M 26/05; F02M 26/06; F02M 2026/001; F02B 75/282; F02B 3/06; F02B 2075/025; F02B 37/22; F01B 7/14
USPC ........................................................ 60/605.2
See application file for complete search history.

(56) References Cited

U.S. PATENT DOCUMENTS

| | | | |
|---|---|---|---|
| 5,622,152 A * | 4/1997 | Ishida | .................... F02M 45/02 123/446 |
| 8,245,701 B2 | 8/2012 | Styles et al. | |
| 9,732,682 B2 | 8/2017 | Tietze et al. | |

(Continued)

FOREIGN PATENT DOCUMENTS

WO     2016164168 A1    10/2016

Primary Examiner — Patrick D Maines
Assistant Examiner — Dapinder Singh
(74) Attorney, Agent, or Firm — Geoffrey Brumbaugh; McCoy Russell LLP

(57) ABSTRACT

Methods and systems for providing exhaust gas recirculation to a two stroke opposed piston diesel engine are described. In one example, high and low pressure exhaust gas recirculation systems may be activated or deactivated in response to exhaust gas hydrocarbon concentration and particulate matter flow rate from the engine. In addition, operation of the low and high pressure exhaust gas recirculation systems may be responsive to an operating state of a supercharger compressor.

17 Claims, 4 Drawing Sheets

(51) Int. Cl.
*F02M 26/00* (2016.01)
*F02B 75/02* (2006.01)

(56) References Cited

U.S. PATENT DOCUMENTS

| | | | |
|---|---|---|---|
| 2004/0050375 A1* | 3/2004 | Arnold | F02B 37/18 123/568.12 |
| 2012/0060499 A1 | 3/2012 | Nitzke et al. | |
| 2015/0033736 A1 | 2/2015 | Kalebjian et al. | |
| 2019/0003373 A1* | 1/2019 | Regner | F02B 25/08 |

* cited by examiner

EGR SYSTEM AND METHOD FOR AN OPPOSED PISTON ENGINE

BACKGROUND/SUMMARY

An opposed piston two stroke diesel engine may have high pressure (HP) exhaust gas recirculation (EGR) system and low pressure (LP) EGR system. The HP EGR system may transfer exhaust gases from upstream of a turbocharger turbine to a location downstream of a turbocharger compressor. Exhaust gas from the HP EGR system may also be directed into a supercharger compressor before it enters engine cylinders. The LP EGR system may transfer exhaust gas from downstream of an after treatment device and downstream of the turbocharger turbine to a location upstream of the turbocharger compressor. Exhaust gas from the LP EGR system may flow through the turbocharger compressor and the supercharger compressor. The LP EGR system may be activated when the HP EGR system is deactivated. Further, the HP EGR system may be activated when the LP EGR system is deactivated. However, there may be vehicle operating conditions where operating the HP EGR system or the LP EGR system may degrade engine performance over time.

The inventors herein have recognized that a LP EGR system may have advantages over a HP EGR system during some vehicle operating conditions and that the HP EGR system may have advantages over the LP EGR system during some vehicle operating conditions. As such, the inventors have developed a two stroke diesel engine operating method, comprising: receiving data indicative of a concentration of hydrocarbon (HC) and/or particulate matter (PM) emissions flowing from an engine to a controller; and deactivating a high pressure exhaust gas recirculation (EGR) system and activating a low pressure EGR system in response to the concentration of HC emissions and/or particulate matter (PM) flowing from the engine.

By activating and deactivating high and low pressure EGR systems responsive to a concentration of hydrocarbon emissions flowing from the engine, it may be possible to provide the technical result of providing EGR to an engine while reducing hydrocarbons and/or particulate matter that may create deposits on a compressor or foul the charge air cooler. In particular, the LP EGR system may be activated and the HP EGR system may be deactivated to reduce the possibility of hydrocarbons/particulate matter depositing on the compressor blades so that compressor balance and efficiency may be maintained as well as avoiding charge air cooler fouling/plugging. Hydrocarbons that exit the engine may be oxidized within an after treatment system so that EGR with a low concentration of hydrocarbons may be provided upstream of a supercharger compressor. Similarly, a diesel particulate filter (DPF) can remove PM exiting the engine to avoid fouling of the compressor and/or charge air cooler. In this way, exhaust gases may be scrubbed before entering the supercharger compressor during conditions when high concentrations of HC and/or PM may be present in engine exhaust gas.

The present description may provide several advantages. Specifically, the approach may allow a two stroke diesel engine to operate with EGR even when engine emissions comprising HC or particulate matter is higher than is desired. Further, the approach may decrease supercharger compressor and/or charge air cooler degradation. Further still, the approach may adjust EGR system operation responsive to whether or not the supercharger compressor is operating so that the activated EGR system conforms to other engine operating conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
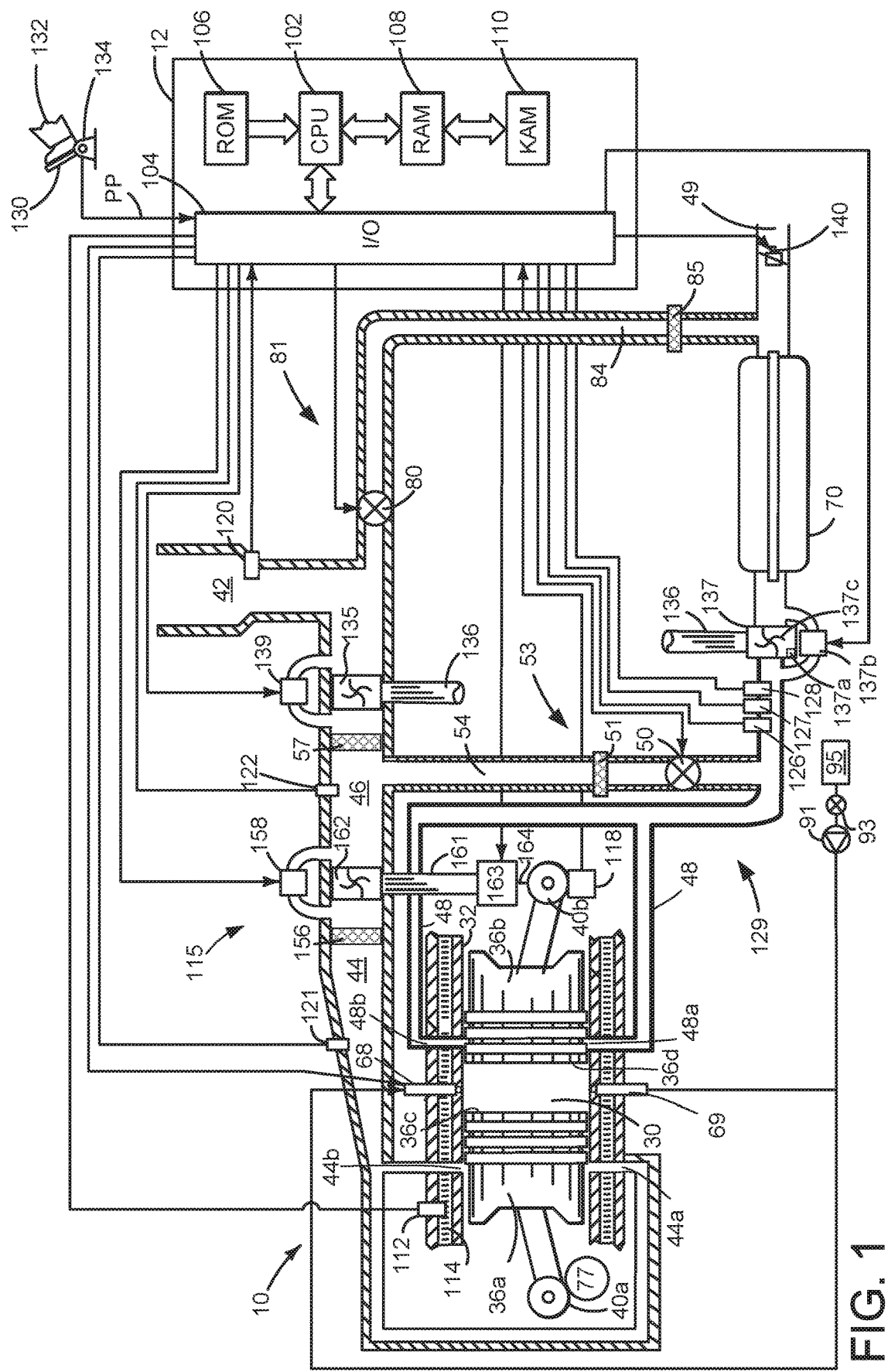
FIG. 1 shows a schematic depiction of an engine.
Figure 2:
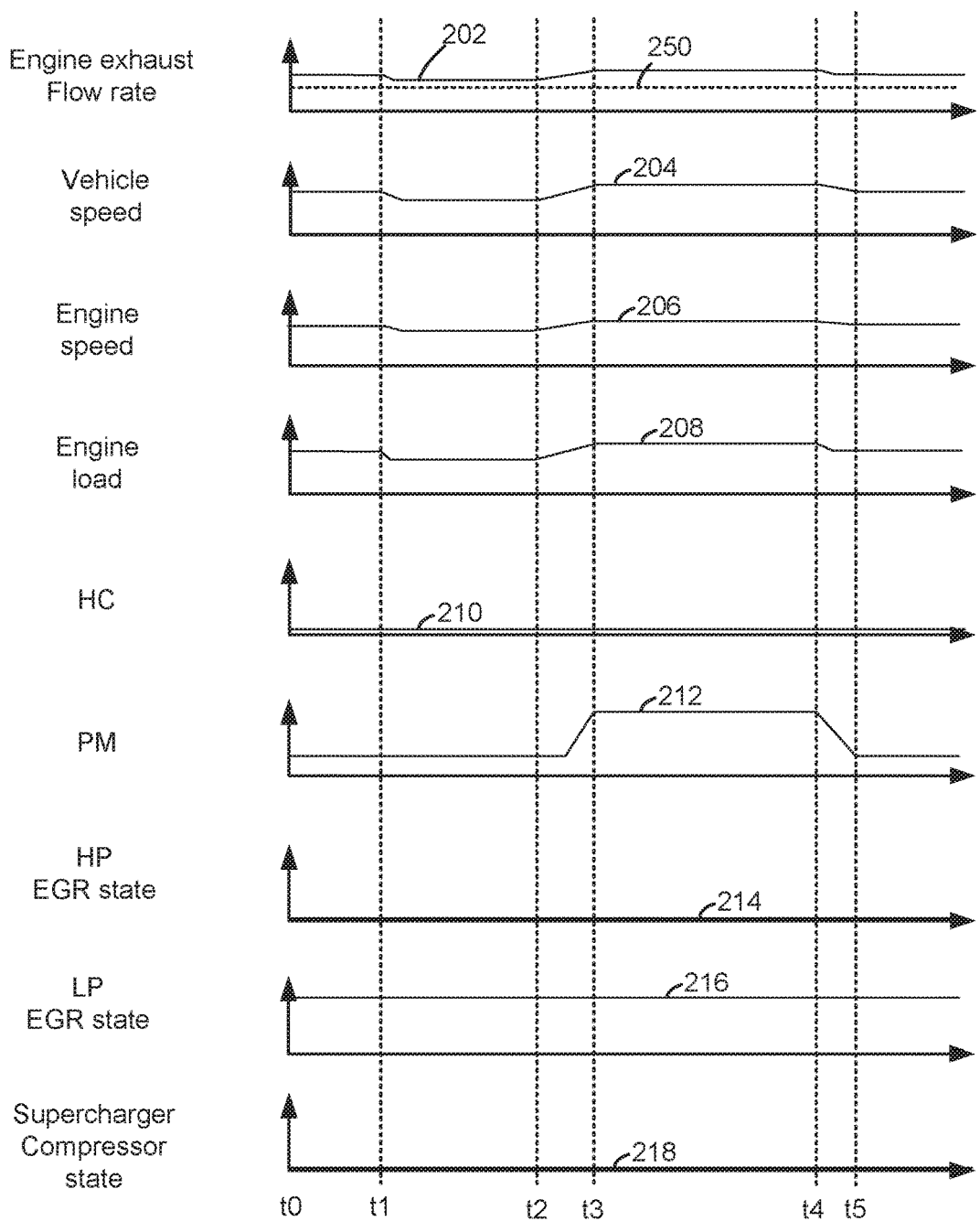
FIGS. 2 and 3 show example prophetic engine operating sequences for the engine shown in FIG. 1.
Figure 3:
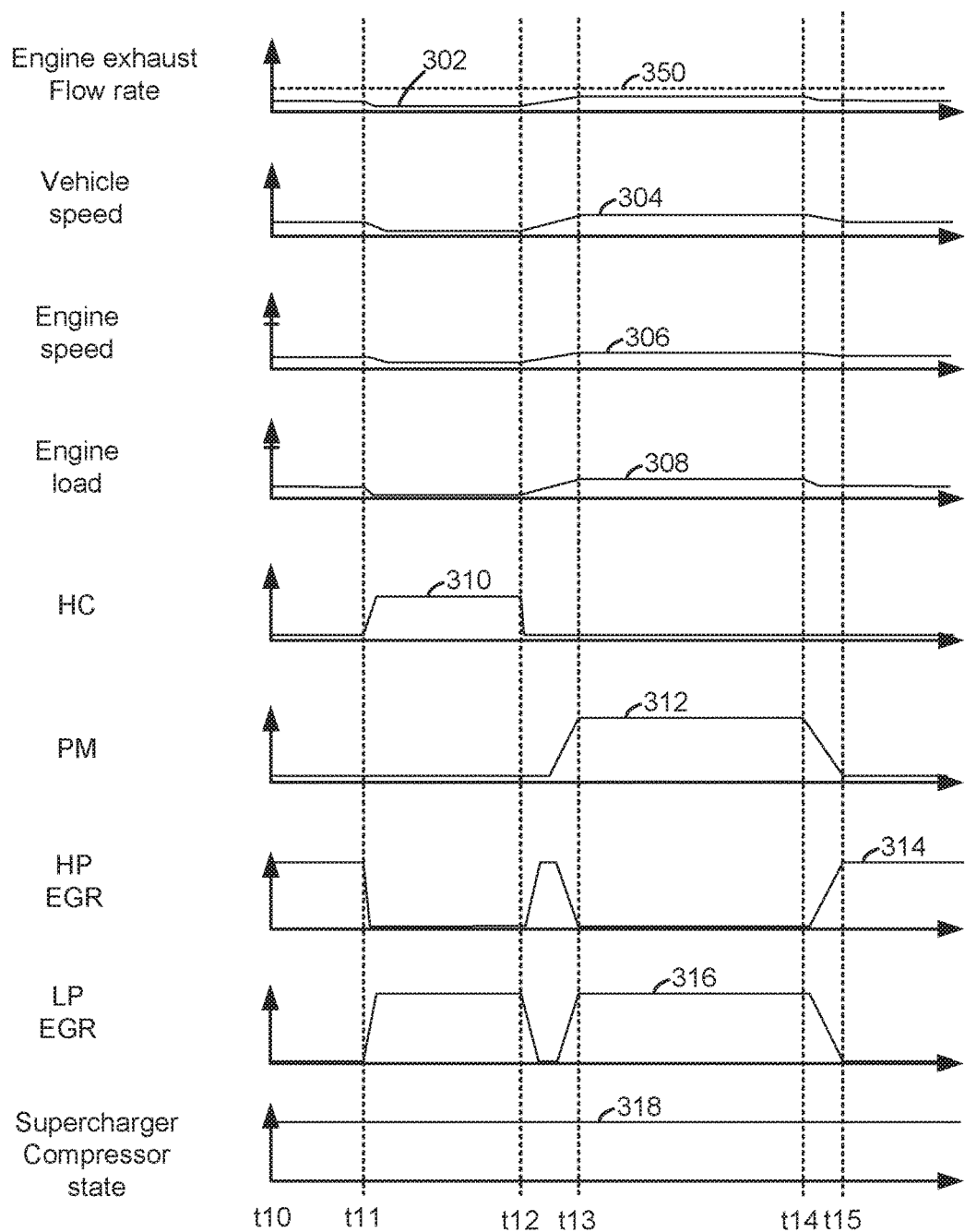
Figure 4:
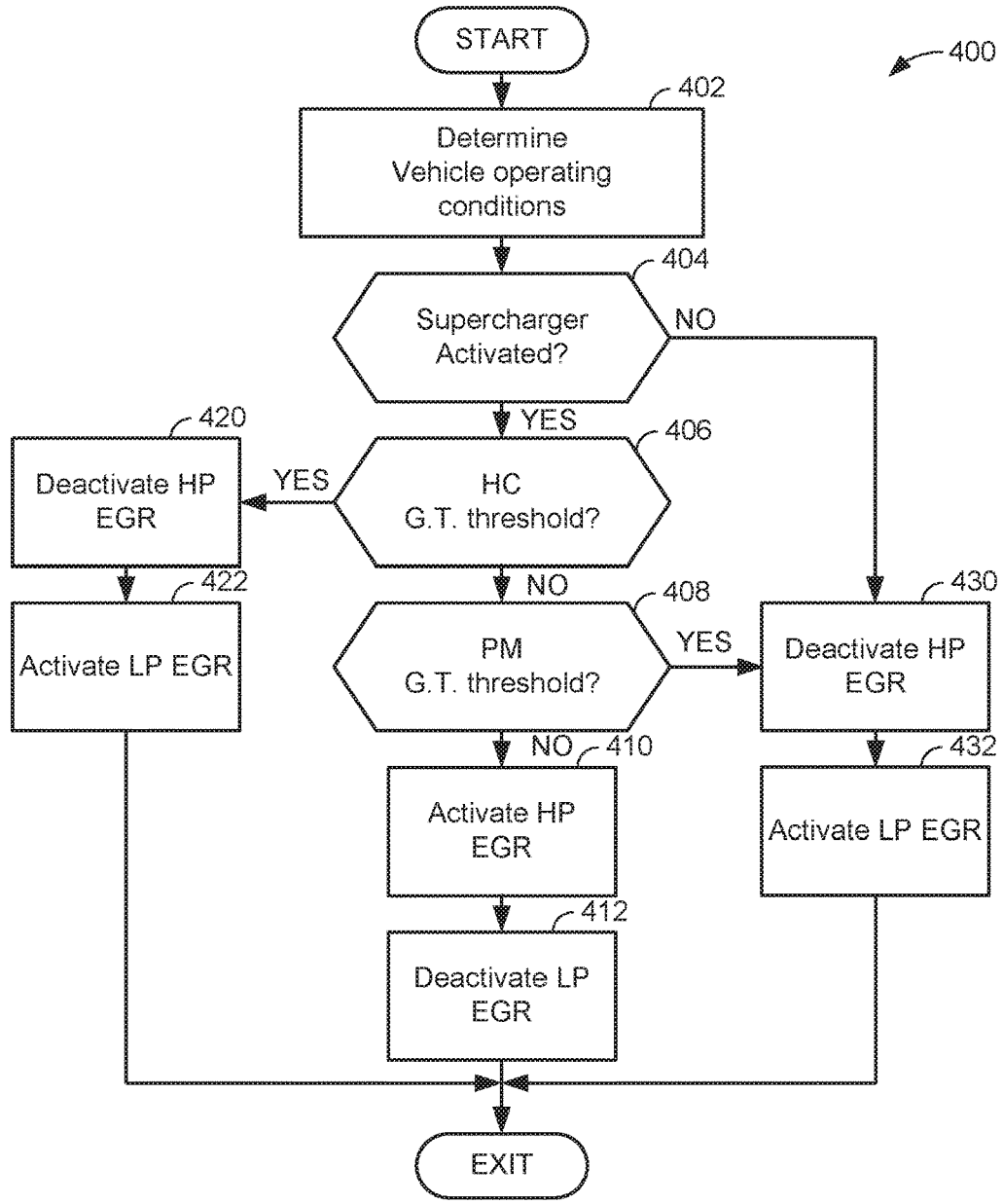
FIG. 4 shows an example method for operating an engine with LP and HP EGR systems.

The present description is related to providing EGR to a two stroke diesel engine. FIG. 1 shows one example of a boosted two stroke diesel engine that includes a mechanically driven supercharger and a turbocharger. FIGS. 2 and 3 show example engine operating sequences where EGR is supplied to the two stroke diesel engine via HP and LP EGR systems. FIG. 4 shows an example method for operating the two stroke diesel engine and providing EGR to the engine. The LP EGR system may be activated to reduce the possibility of supercharger compressor degradation and the HP EGR system may be activated during engine operating conditions when the turbocharger compressor lacks capacity to provide a desired pressure in the engine's intake system.

Referring to FIG. 1, opposed piston two stroke internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes cylinder 30 and cylinder walls 32 with pistons 36a and 36b positioned therein and connected to crankshafts 40a and 40b respectively. Crankshafts 40a and 40b may be coupled together via chains or gears. Crankshafts 40a and 40b may be rotated by electric machine 77 (e.g., a starter motor) to crank engine 10. Cylinder 30 is shown communicating with intake manifold 44 and exhaust manifold 48 via intake ports 44a and 44b and exhaust ports 48a and 48b.

Fuel injectors 68 and 69 are shown positioned in cylinder walls 32 and they may inject fuel directly into cylinder 30, which is known to those skilled in the art as direct injection. Fuel is delivered to fuel injectors 68 and 69 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine intake system 115 includes intake manifold 44 that is shown communicating with mechanically driven supercharger compressor 162, which draws air from downstream of turbocharger compressor 135. Supercharger compressor 162 is driven via crankshaft 40b, shaft 161, and supercharger drive ratio changing device 163, which may be coupled to crankshaft 40b via mechanism 164 (e.g., gears, a chain, or a belt). Supercharger drive ratio changing device 163 changes speed of supercharger compressor 162 relative to speed of crankshaft 40b. Gears within device 163 may be disengaged or a clutch may be opened to deactivate supercharger compressor 162. Supercharger compressor may be activated via closing a clutch or engaging gear within device 163.

Supercharger compressor bypass valve 158 may be selectively opened to reduce air pressure in intake manifold 44 and return air and/or exhaust gas to upstream of supercharger compressor 162 in a direction of air flow into the engine (e.g., from air intake 14 to cylinder inlet ports 44a and 44b). Supercharger bypass valve 158 may also be opened to allow pressurized air to bypass supercharger compressor 162 when supercharger compressor 162 is deactivated. In some examples, a charge air cooler 156 may be provided downstream of supercharger compressor 162 to cool the air charge entering cylinder 30.

Turbocharger compressor 135 draws air from air intake 42 and supplies the air to mechanically driven supercharger compressor 156. Exhaust gases spin turbocharger variable geometry turbine 137 which is coupled to turbocharger compressor 135 via shaft 136. A positon of vane actuator 137a may be adjusted via controller 12 to increase or decrease rotational speed of turbine 137. In alternative examples, a waste gate 137b may replace or be used in addition to vane actuator 137a. Vane actuator 137a adjusts a position of variable geometry turbine vanes 137c. Exhaust gases can pass through turbine 137 supplying little energy to rotate turbine 137 when vanes 137c are in an open position. Exhaust gases can pass through turbine 137 and impart increased force on turbine 137 when vanes 137c are in a closed position. Alternatively, wastegate 137b or a bypass valve allows exhaust gases to flow around turbine 137 so as to reduce the amount of energy supplied to the turbine.

Exhaust gases may be recirculated to cylinder 30 via low pressure (LP) exhaust gas recirculation (EGR) system 81. LP EGR system may include EGR cooler 85, LP EGR valve 80, and LP EGR passage 84. LP exhaust gases may flow from downstream of emissions after treatment device 70 and turbocharger turbine 137. LP EGR may flow to the engine air intake system 115 when pressure in exhaust system 129 downstream of turbocharger compressor 137 and upstream of exhaust pressure control valve 140 is greater than pressure upstream of turbocharger compressor 135. LP EGR may flow through LP EGR cooler 85 to reduce engine exhaust gas temperatures.

Exhaust gases may also be recirculated to cylinder 30 via high pressure (HP) exhaust gas recirculation (EGR) system 53. HP EGR system may include EGR cooler 51, HP EGR valve 50, and HP EGR passage 54. HP exhaust gases may flow from exhaust manifold 48 and upstream of emissions after treatment device 70. HP EGR may flow to the engine air intake system 115 when pressure in exhaust system 129 upstream of emissions after treatment device 70 is greater than pressure downstream of turbocharger compressor 135. HP EGR may flow through HP EGR cooler 50 to reduce engine exhaust gas temperatures.

Fuel may be injected to cylinder 30 when pistons 36a and 36b are approaching each other after piston 36a covers intake ports 44a and 44b. The fuel may then be combusted with air in cylinder 30 when piston 36 is near top-dead-center compression stroke. The fuel and air may ignite via compression ignition. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements. Hydrocarbon sensor 127 may sense a concentration of hydrocarbons exhausted from engine 10. Particulate sensor 128 may sense particulates (e.g., carbonaceous soot) exhausted from engine 10.

Engine 10 does not include glow plugs or spark plugs since it is a compression ignition engine and since it does not include a cylinder head. Further, engine 10 does not include poppet valves to regulate air and exhaust flow into and out of cylinder 30.

Exhaust valve 140 (e.g., a butterfly valve) is shown positioned in exhaust passage 49 downstream of turbine 137a and downstream of emissions device 70. Exhaust valve 140 may be opened and closed to control pressure in exhaust manifold 48 and flow through exhaust manifold 48. Closing exhaust valve 140 restricts flow through exhaust valve 140 and may increase pressure in exhaust manifold 48 and decrease flow through exhaust manifold 48. Opening exhaust valve 140 may improve flow through exhaust valve 140 and reduce pressure in exhaust manifold 48 and increase flow through exhaust manifold 48. Exhaust valve 140 may be adjusted to increase or decrease exhaust flow through LP EGR system 81 and HP EGR system 53.

Emissions device 70 can include an oxidation catalyst and particulate filter, in one example. In another example, multiple emission control devices, each with multiple bricks, can be used. Emissions device 70 can include an oxidation catalyst in one example. In other examples, the emissions device may include a lean NOx trap or a selective catalytic reduction (SCR), and/or a diesel particulate filter (DPF).

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44; exhaust gas oxygen concentration from oxygen sensor 126; an engine position sensor from a Hall effect sensor 118 sensing crankshaft 40b position; and a measurement of air mass entering the engine from sensor 120 (e.g., a hot wire air flow meter). Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a two stroke cycle: the cycle includes a first stroke where the intake piston 36a travels toward exhaust piston 36b and exhaust piston 36b travels toward intake piston 36a. In the second stroke, intake piston 36a travels away from exhaust piston 36b and exhaust piston 36b travels away from intake piston 36a. Intake piston 36a controls flow through intake ports 44a and 44b. Exhaust piston 36b controls flow through exhaust ports 48a and 48b. In this example, exhaust piston 36b leads intake piston 36a by reaching a top dead center position (e.g., a maximum distance exhaust piston 36b is from crankshaft 40b) a few crankshaft degrees (e.g., depending on configuration, the difference may range between 0 and 20 crankshaft degrees) before intake piston 36 a reaches its top dead center position (e.g., maximum distance intake piston 36a is from crankshaft 40a). Thus, exhaust piston motion is offset from intake piston motion by a few crankshaft degrees.

During the first stroke, generally, the intake piston 36a and exhaust piston 36b are moving toward each other to compress air that has entered cylinder 30. The stroke begins at bottom dead center (BDC) for intake piston 36a (intake piston 36a is closest distance to crankshaft 40a) and it ends at top dead center for intake piston 36a (intake piston 36a is at its farthest distance from crankshaft 40a). As previously mentioned, exhaust piston 36b leads intake piston 36a by a few degrees so that it is already traveling toward its TDC position when intake piston is at BDC. Further, exhaust piston 36b reaches its TDC position just before intake piston 36a reaches its TDC position. Exhaust piston 36b is located just after its TDC position when intake piston 36a reaches its TDC position. Cylinder volume is smallest when intake piston 36a and exhaust piston 36b are near their respective TDC positions. Air and fuel are compressed in cylinder 30 as intake piston 36a and exhaust piston 36b advance toward their respective TDC positions. Intake ports 44a and 44b are open and pressurized air flows into cylinder 30 when intake pistons 36a and exhaust piston 36b are near their respective BDC positions. Exhaust ports 48a and 48b are also open when intake piston 36a and exhaust piston 36b are near BDC. Supercharger compressor 162 and turbocharger compressor 135 provide pressurized air to intake manifold 44 which may flow into cylinder 30 when intake ports 44a and 44b are open. As intake piston 36a and exhaust piston 36b move toward their respective TDC positions, exhaust ports 48a and 48b close. The crankshaft continues to rotate and after a predetermined actual total number of crankshaft degrees, intake ports 44a and 44b are closed to prevent additional air from entering cylinder 36. Thus, the exhaust ports are opened before the intake ports and the exhaust ports remain open for nearly the entire duration that the intake ports are open. Fuel is injected to cylinder 30 after exhaust ports 44a and 44b close, then the fuel and air mixture is ignited when intake piston 36a and exhaust piston 36b are near their respective TDC locations. The fuel and air mixture is ignited by compression ignition and not via a spark plug or energy from a glow plug. Fuel may be injected to cylinder 30 via a plurality of injections including pilot injections, main injections, and post injections.

During the second stroke, generally, the intake piston 36a and exhaust piston 36b are moving apart from each other after combustion takes place in cylinder 30. The second stroke begins at TDC of intake piston 36a and it ends at BDC of intake piston 36a. Intake piston 36a and exhaust piston 36b approach their respective BDC positions near where volume of cylinder 30 is greatest. Gases expanding in cylinder 30 push intake piston 36a and exhaust piston 36b apart toward their respective BDC positions. Exhaust piston 36b passes exhaust ports 48a and 48b as it travels toward its BDC. Exhaust ports 48a and 48b are uncovered when top of exhaust piston 36d passes exhaust ports 48a and 48b while exhaust piston 36b is traveling toward crankshaft 40b. Exhaust gases exit cylinder 30 after exhaust piston 36b passes exhaust ports 48a and 48b while traveling toward bottom dead center. Intake pistons 36a and exhaust piston 36b travel further toward their respective bottom dead center positions, and after a predetermined actual total number of crankshaft degrees, intake piston 36a uncovers intake ports 44a and 44b. Intake ports 44a and 44b are uncovered when top of intake piston 36c passes intake ports 44a and 44b while intake piston 36a is traveling toward crankshaft 40a. Fresh air enters cylinder 30 via intake ports 44a and 44b when intake ports 44a and 44b are uncovered. Intake piston 36a and exhaust piston 36b continue to travel toward their respective BDC locations. After intake piston reaches BDC the cylinder cycle repeats.

Thus, the engine cycle is comprised of two strokes and the engine cycle is one engine revolution. Other engine cylinders operate in a similar way but these other cylinders may combust air and fuel out of phase with the cylinder shown. For example, top dead center compression stroke of one engine cylinder may be at zero crankshaft degrees while top dead center of another cylinder may be at one hundred and eighty crankshaft degrees.

The system of FIG. 1 provides for an engine system, comprising: an opposed piston two stroke diesel engine; a supercharger coupled to the opposed piston two stroke diesel engine, the supercharger including a supercharger compressor bypass valve; a turbocharger coupled to the opposed piston two stroke diesel engine, the turbocharger including a turbocharger compressor bypass valve; and a controller including executable instructions stored in non-transitory memory that cause the controller to operate the opposed piston two stroke engine with less than a threshold particulate matter mass flow rate output and less than a threshold hydrocarbon concentration output, and additional instructions to deactivate the low pressure EGR system and activated the high pressure EGR system in response to the opposed piston two stroke engine operating with less than the threshold particulate matter mass flow rate output and less than the threshold hydrocarbon concentration output.

In some examples, the engine system further comprises additional instructions that cause the controller to operate the opposed piston two stroke engine with greater than a threshold particulate matter mass flow rate output, and additional instructions to activate the low pressure EGR system and deactivated the high pressure EGR system in response to the opposed piston two stroke engine operating with greater than the threshold particulate matter mass flow rate output. The engine system further comprises additional instructions that cause the controller to operate the opposed piston two stroke engine with greater than a threshold particulate matter mass flow rate output, and additional instructions to activate the low pressure EGR system and deactivated the high pressure EGR system in response to the opposed piston two stroke engine operating with greater than the threshold hydrocarbon concentration output. The engine system further comprises additional instructions that cause the controller to deactivate the high pressure EGR system and activate the low pressure EGR system in response to activating the supercharger. The engine system further comprises additional instructions that cause the controller to open the supercharger compressor bypass valve in response to deactivating the supercharger. The engine system further comprises an exhaust back pressure control valve positioned in an exhaust system of the opposed piston two stroke diesel engine.

Referring now to FIG. 2, a first prophetic engine operating sequence is shown. The engine 10 may be operated as shown via the system shown in FIG. 1 including the method of FIG. 4. In this example engine operating sequence, the supercharger compressor is deactivated to reduce system parasitic losses when the turbocharger has capacity to provide a desired air flow amount to the engine. FIG. 2 includes nine plots that are time aligned and that represent control variables at the time of the sequence.

The first plot from the top of FIG. 2 is a plot of engine exhaust flow rate (e.g., the flow rate of exhaust exiting the engine) versus time. The vertical axis represents the engine exhaust flow rate and the exhaust flow rate increases in the direction of the vertical axis arrow. The horizontal axis represents time and time increases from the left side of the plot to the right side of the plot. Horizontal line 250 represents a threshold engine exhaust flow rate. Energy provided to the turbocharger may be low when the engine exhaust flow rate is below threshold 250. Consequently, the turbocharger may not provide a desired air flow amount to the engine if the engine exhaust flow rate is less than threshold 250. Trace 202 represents engine exhaust flow rate.

The second plot from the top of FIG. 2 is a plot of vehicle speed versus time. The vertical axis represents vehicle speed and the vehicle speed increases in the direction of the vertical axis arrow. The horizontal axis represents time and time increases from the left side of the plot to the right side of the plot. Trace 204 represents vehicle speed.

The third plot from the top of FIG. 2 is a plot of engine speed versus time. The vertical axis represents engine speed and the engine speed increases in the direction of the vertical axis arrow. The horizontal axis represents time and time increases from the left side of the plot to the right side of the plot. Trace 206 represents engine speed.

The fourth plot from the top of FIG. 2 is a plot of engine load versus time. The vertical axis represents engine load and the engine load increases in the direction of the vertical axis arrow. The horizontal axis represents time and time increases from the left side of the plot to the right side of the plot. Trace 208 represents engine load.

The fifth plot from the top of FIG. 2 is a plot of engine hydrocarbon concentration in engine exhaust emissions versus time. The vertical axis represents engine hydrocarbon concentration in engine exhaust emissions and the engine hydrocarbon concentration in engine exhaust emissions increase in the direction of the vertical axis arrow. The horizontal axis represents time and time increases from the left side of the plot to the right side of the plot. Trace 210 represents engine hydrocarbon concentration in engine exhaust emissions.

The sixth plot from the top of FIG. 2 is a plot of engine particulate matter (e.g., carbonaceous soot) mass in engine exhaust emissions versus time. The vertical axis represents engine particulate matter (PM) mass in engine exhaust emissions and the engine particulate matter mass in engine exhaust emissions increase in the direction of the vertical axis arrow. The horizontal axis represents time and time increases from the left side of the plot to the right side of the plot. Trace 212 represents engine particulate matter mass in engine exhaust emissions.

The seventh plot from the top of FIG. 2 is a plot of engine HP EGR state versus time. The vertical axis represents engine HP EGR state and the HP EGR system is activated (e.g., exhaust flowing through the HP EGR system) when trace 214 is at a higher level near the vertical axis arrow. The HP EGR system is not activated when trace 214 is at a lower level near the horizontal axis. The horizontal axis represents time and time increases from the left side of the plot to the right side of the plot. Trace 214 represents engine HP EGR state.

The eighth plot from the top of FIG. 2 is a plot of engine LP EGR state versus time. The vertical axis represents engine LP EGR state and the LP EGR system is activated (e.g., exhaust flowing through the LP EGR system) when trace 216 is at a higher level near the vertical axis arrow. The LP EGR system is not activated when trace 216 is at a lower level near the horizontal axis. The horizontal axis represents time and time increases from the left side of the plot to the right side of the plot. Trace 216 represents engine LP EGR state.

The ninth plot from the top of FIG. 2 is a plot of supercharger compressor state versus time. The vertical axis represents supercharger compressor operating state and the supercharger compressor is activated when trace 218 is near the vertical axis arrow. The supercharger compressor is deactivated when trace 218 is near the horizontal axis. The supercharger compressor may be deactivated via opening a clutch or disengaging gears in supercharger drive ratio changing device 163 so that the supercharger compressor is not rotated via the engine crankshaft. Trace 218 represents supercharger compressor state.

At time t0, the engine is operating combusting air and fuel and engine exhaust flow is greater than threshold 250. Since the turbocharger compressor has capacity to provide larger amounts of air to the engine when engine exhaust flow is greater than threshold 250, the supercharger compressor is deactivated. Vehicle speed is at a middle level and engine speed is also at a middle level. Engine load is at a higher middle level and engine HC concentration emissions are low. Engine particulate matter emissions are also low and the HP EGR system is deactivated. The LP EGR system is activated so that EGR flows into the turbocharger compressor instead of upstream of the turbocharger compressor where exhaust pressure would have to exceed pressured downstream of the turbocharger compressor to induce EGR flow to the engine. Thus, by providing LP EGR upstream of the turbocharger compressor, exhaust pressure may be reduced to improve engine efficiency while EGR is provided to the engine.

At time t1, engine load is reduced in response to accelerator pedal position being reduced (not shown). The vehicle speed and engine speed also begin to decline since torque produced via the engine is reduced. The engine exhaust flow is reduced, but it remains greater than threshold 250 so the supercharger compressor remains deactivated. The engine HC concentration and particulate matter (PM) levels remain low. The LP EGR system remains active and the HP EGR system remains deactivated.

At time t2, engine load begins to increase in response to the accelerator pedal being depressed (not shown). The engine speed, exhaust flow, and vehicle speed also begin to increase in response to the increase in engine load. The engine HC and PM emissions remain at their previous levels. The HP EGR system remains deactivated and the LP EGR system remains activated. The supercharger compressor also remains deactivated.

Between time t2 and time t3, the vehicle speed, engine load, engine speed, and exhaust flow continue to increase. The PM also increases, but the HC concentration in the engine exhaust is low. The HP EGR system remains deactivated and the LP EGR system remains activated. The supercharger compressor remains deactivated.

At time t3, the engine load levels off to a higher constant value. The engine speed and vehicle speed also level off to higher constant values. The exhaust flow is at a higher level and the HC emissions are low. The PM emissions have been increased to a higher level, but PM may be trapped in the after treatment system so that little PM may flow into the turbocharger compressor, thereby reducing soot accumulation within the turbocharger compressor and the air charge cooler. The HP EGR system remains deactivated and the LP EGR system remains activated. The supercharger compressor remains deactivated.

At time t4, engine load begins to decrease in response to the accelerator pedal being partially released (not shown). The engine speed, exhaust flow, and vehicle speed also begin to decrease in response to the decrease in engine load. The engine HC emissions remain low and PM emissions begin to decline. The HP EGR system remains deactivated and the LP EGR system remains activated. The supercharger compressor also remains deactivated. Between time t4 and time t5, the vehicle speed, engine load, engine speed, and exhaust flow continue to decrease. The PM also decreases, but the HC concentration in the engine exhaust remains low. The HP EGR system remains deactivated and the LP EGR system remains activated. The supercharger compressor remains deactivated.

At time t5, the engine load levels off to a lower constant value and the engine speed and vehicle speed also level off to lower constant values. The exhaust flow is at a lower level, but it remains greater than threshold 250. The PM emissions have been decreased to a lower level, but EGR continues to flow since LP EGR is supplied to the inlet of the turbocharger compressor. The HP EGR system remains deactivated and the LP EGR system remains activated. The supercharger compressor remains deactivated.

In this way, when exhaust flow is greater than a threshold such that the supercharger compressor may be deactivated to reduce parasitic losses, LP EGR may be supplied to the engine and PM that may flow to the turbocharger compressor may be reduced. Thus, when the supercharger compressor is deactivated, the HP EGR system may be deactivated and the LP EGR system may be activated to control NOx formation within the engine.

Referring now to FIG. 3, a second prophetic engine operating sequence is shown. The engine 10 may be operated as shown via the system shown in FIG. 1 including the method of FIG. 4. In this example engine operating sequence, the supercharger compressor is activated to increase air flow to engine 10 at times when the turbocharger may not have capacity to provide a desired air flow amount to the engine. FIG. 3 includes the same nine plots that are shown in FIG. 2. The plots are time aligned and that represent control variables at the time of the sequence. For the sake of brevity, the plots of FIG. 3 are not described to avoid redundancy, but the plots follow the description of the plots provided for FIG. 2, except as otherwise provided below.

At time t10, the engine is operating combusting air and fuel and engine exhaust flow is less than threshold 350. Since the turbocharger compressor does not have the capacity to provide larger amounts of air to the engine when engine exhaust flow is less than threshold 350, the supercharger compressor is activated. Vehicle speed is at a lower middle level and engine speed is also at a lower middle level. Engine load is at a lower middle level and engine HC concentration emissions are low. Engine particulate matter (PM) emissions are also low and the HP EGR system is activated. The HP EGR system is activated so that EGR flows into the supercharger compressor where pressure may be low, especially since the turbocharger compressor may have insufficient capacity to provide higher air flow rates to the engine. Thus, by providing HP EGR downstream of the turbocharger compressor, EGR may be provided to the engine when the turbocharger compressor may not have high flow capacity and when engine HC and PM emissions may be low. The supercharger compressor remains activated as indicated by the supercharger compressor state being at a higher level.

At time t11, engine load is reduced in response to accelerator pedal position being reduced (not shown). The vehicle speed and engine speed also begin to decline since torque produced via the engine is reduced. The engine exhaust flow is reduced and it remains less than threshold 350 so that the supercharger compressor remains activated. The engine HC concentration begins to increase shortly after time t11 and the LP EGR system is activated shortly after time t11 in response to the increased HC concentration. The HP EGR system is deactivated in response to the increasing HC level. By activating the LP EGR system, hydrocarbons that enter the engine intake system 115 may be reduced to lower the possibility of hydrocarbons depositing on compressor blades and fouling an air charge cooler in the engine intake system. The hydrocarbons exiting the engine may be reduced via passing through the after treatment system in the engine exhaust system 129.

At time t12, engine load begins to increase in response to the accelerator pedal being depressed (not shown). The engine speed, exhaust flow, and vehicle speed also begin to increase in response to the increase in engine load. The engine HC emissions remain low and the PM emissions from the engine begin to be reduced a short time after time t12. The HP EGR system is activated a short time after time t12 in response to the reduction of engine HC emissions. The LP EGR system is deactivated in response to the reduction in HC emissions from the engine shortly after time t12. The supercharger compressor also remains activated.

Between time t12 and time t13, the vehicle speed, engine load, engine speed, and exhaust flow continue to increase. The PM increases in response to the increasing engine load and the LP EGR system is activated in response to the increasing PM emission. The HP EGR system is deactivated in response to the increasing PM emissions and the supercharger compressor remains activated.

At time t13, the engine load levels off to a higher constant value. The engine speed and vehicle speed also level off to higher constant values. The exhaust flow remains less than threshold 350 and the PM emissions are at a higher level. The HC emissions remain at a lower level. The HP EGR system remains deactivated and the LP EGR system remains activated. The supercharger compressor remains activated.

At time t14, engine load begins to decrease in response to the accelerator pedal being partially released (not shown). The engine speed, exhaust flow, and vehicle speed also begin to decrease in response to the decrease in engine load. The engine HC emissions remain low and PM emissions begin to decline. The LP EGR system is deactivated shortly after time t14 in response to reduced PM emissions. The HP EGR system is activated shortly after time t14 in response to lower PM emissions. The HP EGR system may be reactivated since compressors and charge coolers in the engine intake system 115 have a lower chance of degrading when less PM is in the exhaust gases. The supercharger compressor also remains deactivated.

At time t15, the engine load levels off to a lower constant value and the engine speed and vehicle speed also level off to lower constant values. The exhaust flow is at a lower level and it remains less than threshold 350. The PM emissions have been decreased to a lower level and EGR continues to flow since HP EGR is supplied to the inlet of the supercharger compressor. The LP EGR system remains deactivated. The supercharger compressor remains deactivated.

In this way, when exhaust flow is less than a threshold such that the supercharger compressor may be deactivated to reduce parasitic losses, HP EGR may be supplied to the engine. The HP EGR may be activated when HC concentration in engine exhaust is less than a threshold and when PM in the engine is exhaust is less than a threshold. Thus, when the supercharger compressor is activated, the HP EGR system and the LP EGR system may be selectively activated and deactivated to control NOx formation within the engine and reduce compressor and air charge cooler degradation.

Referring now to FIG. 4, a method for providing operating a two stroke diesel engine is shown. The method of FIG. 4 may be stored as executable instructions in non-transitory memory in systems such as shown in FIG. 1. The method of FIG. 4 may be incorporated into and may cooperate with the systems of FIG. 1. Further, at least portions of the method of FIG. 4 may be incorporated as executable instructions stored in non-transitory memory while other portions of the method may be performed via a controller transforming operating states of devices and actuators in the physical world. The controller may employ engine actuators of the engine system to adjust engine operation and operate an engine, according to the methods described below. The system of FIG. 1 may also include executable instructions to operate the engine at the conditions described herein.

At 402, method 400 determines vehicle operating conditions. Vehicle operating conditions (e.g., data) may include but are not limited to vehicle speed, engine speed, engine load, concentration of engine HC emissions, mass flow rate of engine PM emissions, supercharger operating state, and exhaust flow rate. The operating conditions may be determined from output of sensors and actuators shown in the system of FIG. 1. Method 400 proceeds to 404.

At 404, method 400 judges if the supercharger 162 is deactivated. Method 400 may judge that supercharger 162 is deactivated based on a value of a variable stored in controller memory. The value of the variable may be changed if the supercharger is commanded off or on. In other examples, speed of the supercharger may be the basis for determining if the supercharger is activated or deactivated. If method 400 judges that the supercharger is activated, method 400 proceeds to 406. If method 400 judges that the supercharger is not activated, the answer is no and method 400 proceeds to 430.

The supercharger may be activated and deactivated in response to engine exhaust flow rate or other conditions such as engine speed and engine load. For example, the supercharger may be deactivated in response to engine exhaust flow being greater than a threshold such that the turbocharger compressor has capacity to provide air flow to the engine that is greater than a threshold air flow rate. The supercharger may be activated in response to engine exhaust flow being less than a threshold such that the turbocharger compressor does not have capacity to provide air flow to the engine that is greater than a threshold air flow rate. The supercharger compressor bypass valve may be opened when the supercharger is deactivated so that less air and EGR may flow through the supercharger compressor, thereby further reducing the possibility of supercharger compressor degradation when EGR is flowing into the engine air intake 115.

At 430, method 400 deactivates the HP EGR system. The HP EGR system may be deactivated by closing a HP EGR valve. By deactivating the HP EGR system when the supercharger is deactivated, pressurized air may not flow from the turbocharger compressor into the exhaust system via the HP EGR passage. Further, improved exhaust pressure control may be provided via exhaust back pressure valve 140 when the HP EGR system is deactivated while the LP EGR system is activated. Method 400 proceeds to 432.

At 432, method 400 activates the LP EGR system. The LP EGR system may be activated by at least partially opening the LP EGR valve. By activating the LP EGR system when the supercharger is deactivated, hydrocarbons and particulate matter in exhaust gases may oxidized or trapped before the exhaust gases are introduced to the engine intake system 115. By reducing particulate matter and hydrocarbons in the exhaust gases, it may be possible to reduce degradation of the turbocharger compressor, the supercharger compressor, and air charge coolers in the engine intake system 115. Method 400 proceeds to exit after activating the LP EGR system.

The engine controller may include instructions to operate at higher level engine speeds and engine loads where the concentration of HC emissions may be less than a threshold level and the mass flow rate of PM from the engine may be greater than a threshold level in response to engine speed and driver demand torque or engine load. Such conditions may be present when the answer at 408 is yes. The driver demand torque may be input via the accelerator pedal and accelerator pedal position may be converted to a driver demand torque.

The engine may be provided EGR via the LP EGR system over a range of engine speeds and loads after the LP EGR system is activated. Further, the quantity of EGR mass may be varied responsive to vehicle operating conditions after the LP EGR system is activated. In particular, the EGR amount may be adjusted via adjusting a position of the exhaust back pressure control valve 140. Further, the exhaust back pressure valve may be at least partially closed in response to the HP EGR system being deactivated and the LP EGR system being activated. The exhaust back pressure control valve may be closed further when the HP EGR system is deactivated and the LP EGR system is activated to increase a pressure differential across the LP EGR system so that the EGR flow rate may be maintained during the switch from HP EGR to LP EGR.

At 406, method 400 judges if the concentration of HC emission in exhaust gases exiting the engine is greater than a threshold. Method 400 may judge that the concentration of HC emissions in exhaust gases that exit the engine is greater than a threshold by comparing output of a HC sensor to the threshold. If method 400 judges that the concentration of HC emissions in exhaust gases that exit the engine is greater than a threshold, the answer is yes and method 400 proceeds to 420. Otherwise, the answer is no and method 400 proceeds to 408.

At 420, method 400 deactivates the HP EGR system. The HP EGR system may be deactivated by closing a HP EGR valve. By deactivating the HP EGR system, HC in the exhaust gases may not deposit on the supercharger compressor or the charge air cooler located downstream of the supercharger compressor. Method 400 proceeds to 422.

At 422, method 400 activates the LP EGR system. The LP EGR system may be activated by at least partially opening the LP EGR valve. By activating the LP EGR system when the concentration of HC emissions in engine exhaust gases exceeds a threshold, degradation of the supercharger compressor and the air charge cooler may be prevented while EGR still flows to the engine. In particular, hydrocarbons may be oxidized within an oxidation catalyst that is positioned upstream of the LP EGR system in the engine exhaust system 129 so that degradation of the supercharger and turbocharger compressors may be reduced. Further, degradation of air charge coolers in the engine air intake system 115 may be reduced via reducing hydrocarbons that enter the engine air intake system 115. Method 400 proceeds to exit.

The engine controller may include instructions to operate at lower level engine speeds and engine loads where the concentration of HC emissions may be greater than a threshold level and the mass flow rate of PM from the engine may be less than a threshold level in response to engine speed and driver demand torque or engine load. Such conditions may be present when the answer at 406 is yes. The driver demand torque may be input via the accelerator pedal and accelerator pedal position may be converted to a driver demand torque.

At 408, method 400 judges if the PM mass flow rate in exhaust gases exiting the engine is greater than a threshold. Method 400 may judge that PM mass flow rate in exhaust gases that exit the engine is greater than a threshold by comparing output of a PM sensor to the threshold. If method 400 judges that the PM mass flow rate in exhaust gases that exit the engine is greater than a threshold, the answer is yes and method 400 proceeds to 430. Otherwise, the answer is no and method 400 proceeds to 410.

At 410, method 400 activates the HP EGR system. The HP EGR system may be activated by at least partially opening the HP EGR valve. By activating the HP EGR system, EGR may be provided to the engine at lower engine loads when the turbocharger compressor lacks capacity to provide a desired amount of air flow to the engine. Further, the engine may be operated with less exhaust throttling via the exhaust pressure control valve, thereby increasing engine efficiency since pressure where HP EGR enters the engine intake system 115 may be lower when the compressor is operating. Method 400 proceeds to 412.

At 412, method 400 deactivates the LP EGR system. The LP EGR system may be deactivated by closing the LP EGR valve. By deactivating the LP EGR system when the HC and PM mass flow rate in engine exhaust gases are low, exhaust throttling via the exhaust valve may be reduced to improve engine efficiency. Further, since HC and PM are low, the possibility of supercharger compressor degradation may be low. Method 400 proceeds to exit.

The engine controller may include instructions to operate at lower middle level engine speeds and engine loads where the concentration of HC emissions may be less than a threshold level and the mass flow rate of PM from the engine may be less than a threshold level in response to engine speed and driver demand torque or engine load. Such conditions may be present when the answer at 408 is no. The driver demand torque may be input via the accelerator pedal and accelerator pedal position may be converted to a driver demand torque.

In this way, LP and HP EGR systems may be activated and deactivated to improve engine efficiency and reduce engine component degradation. Further, the supercharger bypass valve may be opened when the supercharger compressor is deactivated so that no all air and exhaust in the engine's intake system has to pass through the supercharger compressor. This may further reduce the possibility of engine component degradation.

Thus, method 400 may provide for a two stroke diesel engine operating method, comprising: receiving data indicative of HC emissions flowing from an engine to a controller; and deactivating a high pressure exhaust gas recirculation (EGR) system and activating a low pressure EGR system in response to the HC emissions flowing from the engine. The two stroke diesel engine operating method includes where deactivating the high pressure EGR system and activating the low pressure EGR system is performed in response to the data being indicative of engine HC emissions being greater than a threshold concentration. The two stroke diesel engine operating includes where deactivating the high pressure EGR includes closing a high pressure EGR valve. The two stroke diesel engine operating method further comprises adjusting a position of an exhaust back pressure valve in response to deactivating the high pressure EGR system and activating the low pressure EGR system. The two stroke diesel engine operating method includes where the high pressure EGR system provides exhaust gas to an engine in an engine air intake system at a location upstream of a supercharger compressor and downstream of a turbocharger compressor. The two stroke diesel engine operating method includes where the low pressure EGR system provides exhaust gas to the engine in the engine air intake system at a location upstream of the turbocharger compressor from a location in the exhaust system downstream of an after treatment device and a turbocharger turbine. The two stroke diesel engine operating method further comprises flowing exhaust gas from the low pressure EGR system and through three coolers before the exhaust gas returns to engine cylinders.

Method 400 also provides for a two stroke diesel engine operating method, comprising: receiving data indicative of a particulate matter emissions mass flow rate from an engine to a controller; and deactivating a high pressure exhaust gas recirculation (EGR) system and activating a low pressure EGR system in response to the engine particulate emissions mass flow rate exceeding a threshold flow rate. The two stroke diesel engine operating method further comprises receiving data indicative of HC emissions flowing from the engine and deactivating the high pressure EGR system and activating a low pressure EGR system in response to the HC emissions flowing from the engine. The two stroke diesel engine operating method further comprises operating an engine with HC emissions flowing from the engine being less than a first threshold and the particulate matter mass flow rate from the engine being less than a second threshold, and deactivating the low pressure EGR system and activating the high pressure EGR system in response to the HC emissions flowing from the engine being less than the first threshold and the particulate matter mass flow rate from the engine being less than the second threshold. The two stroke diesel engine operating method includes where deactivating the low pressure EGR system includes closing a low pressure EGR valve. The two stroke diesel engine operating method includes where activating the high pressure EGR system includes opening a high pressure EGR valve. The two stroke diesel engine operating method further comprises operating the engine with a supercharger compressor being deactivated, and activating the low pressure EGR system and deactivating the high pressure EGR system in response to a supercharger compressor being deactivated. The two stroke diesel engine operating method further comprises opening a supercharger bypass valve in response to the supercharger compressor being deactivated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A two stroke diesel engine operating method, comprising:
   receiving, in a controller, data indicative of HC emissions flowing from an engine;
   deactivating a high pressure exhaust gas recirculation (EGR) system and activating a low pressure EGR system in response to the HC emissions flowing from the engine; and
   adjusting a position of an exhaust back pressure valve in response to deactivating the high pressure EGR system and activating the low pressure EGR system.

2. The two stroke diesel engine operating method of claim 1, where deactivating the high pressure EGR system and activating the low pressure EGR system is performed in response to the data indicative of engine HC emissions indicating engine HC emissions being greater than a threshold concentration.

3. The two stroke diesel engine operating method of claim 2, where deactivating the high pressure EGR includes closing a high pressure EGR valve.

4. The two stroke diesel engine operating method of claim 1, where the high pressure EGR system provides exhaust gas to the engine in an engine air intake system at a location upstream of a supercharger compressor and downstream of a turbocharger compressor.

5. The two stroke diesel engine operating method of claim 4, where the low pressure EGR system provides exhaust gas to the engine in the engine air intake system at a location upstream of the turbocharger compressor from a location in the exhaust system downstream of an after treatment device and a turbocharger turbine.

6. The two stroke diesel engine operating method of claim 1, further comprising flowing exhaust gas from the low pressure EGR system and through three coolers before the exhaust gas returns to engine cylinders.

7. A two stroke diesel engine operating method, comprising:
   receiving, in a controller, data indicative of a particulate matter emissions mass flow rate from an engine;
   deactivating a high pressure exhaust gas recirculation (EGR) system and activating a low pressure EGR system in response to the engine particulate emissions mass flow rate exceeding a threshold flow rate; and
   operating the engine with a supercharger compressor being deactivated, and activating the low pressure EGR system and deactivating the high pressure EGR system in response to the supercharger compressor being deactivated.

8. The two stroke diesel engine operating method of claim 7, further comprising receiving data indicative of HC emissions flowing from the engine and deactivating the high pressure EGR system and activating the low pressure EGR system in response to the HC emissions flowing from the engine.

9. The two stroke diesel engine operating method of claim 7, further comprising operating the engine with HC emissions flowing from the engine being less than a first threshold and the particulate matter mass flow rate from the engine being less than a second threshold, and deactivating the low pressure EGR system and activating the high pressure EGR system in response to the HC emissions flowing from the engine being less than the first threshold and the particulate matter mass flow rate from the engine being less than the second threshold.

10. The two stroke diesel engine operating method of claim 9, where deactivating the low pressure EGR system includes closing a low pressure EGR valve.

11. The two stroke diesel engine operating method of claim 9, where activating the high pressure EGR system includes opening a high pressure EGR valve.

12. The two stroke diesel engine operating method of claim 7, further comprising opening a supercharger bypass valve in response to the supercharger compressor being deactivated.

13. An engine system, comprising:
   an opposed piston two stroke diesel engine;
   a supercharger coupled to the opposed piston two stroke diesel engine, the supercharger including a supercharger compressor bypass valve;

a turbocharger coupled to the opposed piston two stroke diesel engine, the turbocharger including a turbocharger compressor bypass valve; and a controller including executable instructions stored in non-transitory memory that cause the controller to operate the opposed piston two stroke engine with less than a threshold particulate matter mass flow rate output and less than a threshold hydrocarbon concentration output, and additional instructions to deactivate a low pressure EGR system and activate a high pressure EGR system in response to the opposed piston two stroke engine operating with less than the threshold particulate matter mass flow rate output and less than the threshold hydrocarbon concentration output, and additional instructions that cause the controller to activate the high pressure EGR system and deactivate the low pressure EGR system in response to activating the supercharger.

14. The engine system of claim 13, further comprising additional instructions that cause the controller to operate the opposed piston two stroke diesel engine with greater than a threshold particulate matter mass flow rate output, and additional instructions to activate the low pressure EGR system and deactivate the high pressure EGR system in response to the opposed piston two stroke diesel engine operating with greater than the threshold particulate matter mass flow rate output.

15. The engine system of claim 13, further comprising additional instructions that cause the controller to operate the opposed piston two stroke diesel engine with greater than the threshold particulate matter mass flow rate output, and additional instructions to activate the low pressure EGR system and deactivate the high pressure EGR system in response to the opposed piston two stroke diesel engine operating with greater than the threshold hydrocarbon concentration output.

16. The engine system of claim 13, further comprising additional instructions that cause the controller to open the supercharger compressor bypass valve in response to deactivating the supercharger.

17. The engine system of claim 13, further comprising an exhaust back pressure control valve positioned in an exhaust system of the opposed piston two stroke diesel engine.

* * * * *